United States Patent [19]

Mabuchi

[11] 4,013,907

[45] Mar. 22, 1977

[54] BATTERY POWERED MOTOR ASSEMBLY

[75] Inventor: Kenichi Mabuchi, Tokyo, Japan

[73] Assignee: Mabuchi Motor Co. Ltd., Tokyo, Japan

[22] Filed: June 30, 1975

[21] Appl. No.: 591,448

[30] Foreign Application Priority Data

July 2, 1974 Japan .............................. 49-76073

[52] U.S. Cl. .................................. 310/50; 310/71
[51] Int. Cl.² ..................................... H02K 7/14
[58] Field of Search ................... 310/50, 47, 89–91, 310/88, 87, 71

[56] References Cited

UNITED STATES PATENTS

| | | | |
|---|---|---|---|
| 3,343,192 | 9/1967 | Goldstein et al. | 310/50 X |
| 3,450,908 | 6/1969 | Mabuchi | 310/50 X |

*Primary Examiner*—Donovan F. Duggan

[57] ABSTRACT

A battery powered motor assembly having an explosion-proof construction so as to enable the motor assembly to house a battery, such as a nickel-cadmium battery, which may discharge hydrogen gas.

6 Claims, 2 Drawing Figures

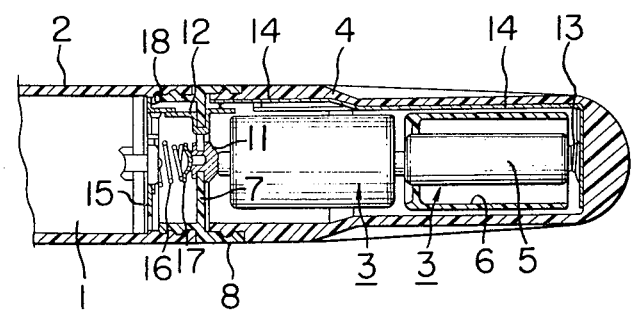
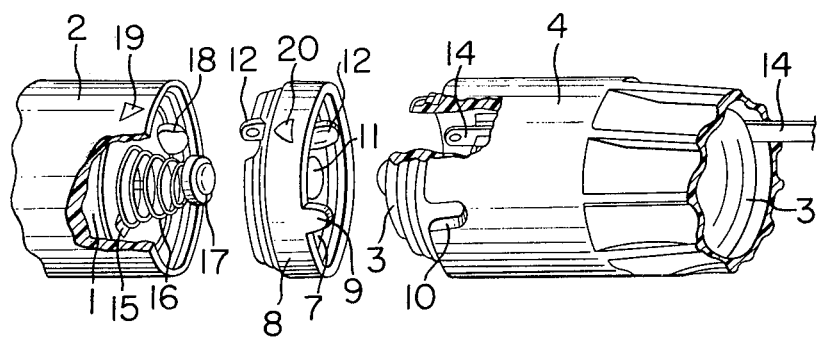

BATTERY POWERED MOTOR ASSEMBLY

BACKGROUND OF THE INVENTION

1. Field of the Invention

The present invention generally relates to a battery powered motor assembly, and more specifically to a battery powered motor assembly comprising a motor casing to fixedly retain a motor therein and a battery casing to fixedly retain a battery therein, the motor and battery casings being rotatably connected together, the battery casing being covered airtightly with a partition wall so as to be explosion-proof to enable the motor assembly to house a battery, such as a nickel-cadmium battery, which may discharge hydrogen gas.

2. Description of the Prior Art

Most conventional battery-powered motor assemblies have such a construction that a motor casing to fixedly retain a motor and a battery casing to fixedly retain a battery are rotatably connected together at their ends and a motor switch is turned on and off by the relative rotation of the motor and battery casings. This type of motor assembly has many advantages including that the motor and battery are axially aligned and that the switchings portion of the motor assembly is not externally exposed.

However, the positive terminal of the battery ohmically contacts one terminal of the motor, and a contact strip extending from the negative terminal of the battery ohmically contacts the other terminal of the motor. To attain this, an end face of the motor casing abuts with one end face of the battery casing without any partition wall between them.

Nickel-cadmium batteries have been widely used in recent years. Batteries of this type have an extremely low internal resistance and can easily discharge several amperes of current. In addition, even after they have been discharged to zero terminal voltage, batteries of this type can be quickly recharged in several minutes.

However, if batteries of this type, which usually have escape valves for releasing gas generated during overcharging, are housed in an electric appliance before gas release is completed, the battery compartment becomes filled with gas, mainly hydrogen gas, threatening an unwanted explosion. Therefore, it is desired to make the battery casing explosion-proof.

Particularly, when such a battery is used to power a submersible type motor, a explosion-proof measures are required for the battery casing which is of a watertight construction.

SUMMARY OF THE INVENTION

An object of the present invention is to provide a battery-powered motor assembly having an explosion-proof construction by separating the battery housing from the motor housing with a partition wall.

Another object of the present invention is to provide a battery-powered motor assembly whose electrical circuit is energized and deenergized by the relative partial rotation of the motor casing and an intermediate casing disposed between the motor casing and the battery casing.

BRIEF DESCRIPTION OF THE DRAWINGS

FIG. 1 is a longitudinal section of major components of a battery-powered motor assembly embodying the present invention.

FIG. 2 is an exploded perspective view of major components of the same.

DETAILED DESCRIPTION OF THE EMBODIMENT

In the figures, a motor 1 is fixedly retained in a tubular motor casing 2, and batteries 3, such as U-2 batteries, or batteries which are made to have the same outer dimensions as U-2 batteries by using dummy batteries, or battery adapters 6 are housed in a battery casing 4.

When U-2 batteries are used as the batteries 3, they can be housed as they are. When Ni-Cd batteries 5 having the same outer dimensions as U-3 batteries are used, the batteries 5 are housed in the battery casing 4 by using an adapter 6 with the battery 5.

In this invention, an intermediate casing 8 having a partition wall 7 is fitted to the abovementioned battery casing 4 as shown in the figure. A fitting tab 9 (FIG. 2) of the intermediate casing 8 is engaged with a fitting notch 10 of the battery casing 4 to prevent relative rotation of the intermediate casing 8 and the battery casing 4. The partition wall 7 of the intermediate casing 8 separates the battery housing space in the battery casing 4 from the motor casing 2.

A first electrical battery contact 11 is carried by the intermediate casing 8 in a hole provided through the center of the partition wall 7 and ohmically engages with the positive terminal of the battery 3. A second electrical contact 12 is carried by the intermediate casing 8 spaced from the center at the periphery of the partition wall 7, and ohmically engages with a battery contact or lead strip 14 connected to the negative terminal of the battery 3 through a spring 13.

The motor casing 2 housing the motor 1 is fitted to the abovementioned intermediate casing 8 so that the motor casing 2 is rotatable relative to the intermediate casing 8.

In the motor casing 2, the positive terminal of the motor 1 is connected to a motor positive terminal strip 15, which carries a contact cap 17 via a spring 16. The negative terminal of the motor 1 is connected to a motor negative terminal strip 18 which protrudes from the end face of the motor 1.

When the motor casing 2 is fitted to the intermediate casing 8 as described above, the contact cap 17 is pressed by the spring 16 against the first electrical contact 11 extending through the hole provided in the middle of the partition wall 7 of the intermediate casing 8. In FIG. 1, which shows the state where the electrical circuit of the motor 1 is completed, when the motor casing 2 is rotated relative to the intermediate casing 8 fitted to the battery casing 4 to a position at which ON marks 19 and 20 are aligned, the motor negative terminal strip 18 ohmically engages with the second electrical contact 12 fixed to the intermediate casing 8, whereby the electrical circuit of the motor 1 is completed. When the motor casing 2 is rotated away from the position shown, the motor negative terminal strip 18 disengages from the second electrical contact 12, whereby the electrical circuit is broken.

In conventional battery-powered motor assemblies of this type, the intermediate casing 8 shown in FIG. 1 is omitted, and therefore the first and second electrical contacts 11 and 12, the spring 16 and the contact cap 17 are not used.

In conventional motor assemblies, a motor casing is fitted directly to a battery casing, and the positive terminal of a battery directly contacts a motor positive terminal strip, A motor negative terminal strip ohmically engages with or disengages from a battery negative lead strip fixed to the battery casing by the relative rotation of the motor and battery casings.

In battery-powered motor assemblies of the conventional construction, when nickel-cadmium batteries, which have the possibility of releasing gas, are used, trapped gas may be exploded by a spark generated by the make and break operation of the electric contacts or motor brushes.

In the present invention, on the other hand, the battery housing space is separated by the partition wall 7 of the intermediate casing 8 from the switching portion in which the motor negative terminal strip 18 ohmically engages with and disengages from the second electric contact 12. Therefore, even if hydrogen gas is released from the batteries 3, this construction effectively prevents gas from leaking to the abovementioned switching portion.

Thus, the battery-powered motor assembly of this invention can be safely used for submersible motors, or as a power source for model submarines, toy waterspouts, etc.

What is claimed is:

1. A battery-powered motor assembly comprising; and electric motor;
   a motor casing to fixedly retain the motor;
   a battery casing to retain at least one battery therein and axially aligned to said motor casing;
   a circuit switch which is turned on and off by the relative rotation of said motor and battery casing to energize and deenergize said motor;
   a partition wall member covering airtightly an open end face of said battery casing facing said motor casing;
   a battery housing space defined by said battery casing and said partition wall member;
   a motor housing space defined by said motor casing and said partition wall member;
   a first electric contact member sealingly extending through the center of said partition wall member to electrically engage with one terminal of the battery and one terminal of said motor;
   and a second electric contact member sealingly extending through said partition wall member spaced from the center thereof to electrically engage with the other terminal of the battery and the other terminal of said motor;
   said battery housing space and said motor housing space being separated by said partition wall member; and
   an intermediate casing coaxially fitted to said motor and battery casings, said intermediate casing carrying said partition wall member.

2. A battery-powered motor assembly of claim 1 wherein the intermediate casing is relatively rotatably fitted to the motor casing.

3. A battery-powered motor assembly of claim 1 wherein a locking mechanism is provided on the battery casing and the intermediate casing to prevent relative rotation thereof.

4. A battery-powered motor assembly of claim 1 wherein the first electric contact member extending through the partition wall member is adapted to contact one terminal of the battery in the battery housing space, and contacts one terminal of the motor in the motor housing space.

5. A battery-powered motor assembly of claim 1 wherein the second electric contact member extending through the partition wall member is adapted to contact the other terminal of the battery in the battery housing space, and engages with and disengages from the other terminal of the motor in accordance with the relative rotation of the intermediate and motor casings.

6. A battery-powered motor assembly of claim 4 wherein a spring mechanism is provided on one terminal of the motor, and said one terminal of the motor contacts the first electric contact member through the spring mechanism.

* * * * *